Aug. 12, 1941.                J. W. TEKER                2,252,446
                          BEARING CONSTRUCTION
                          Filed March 18, 1941
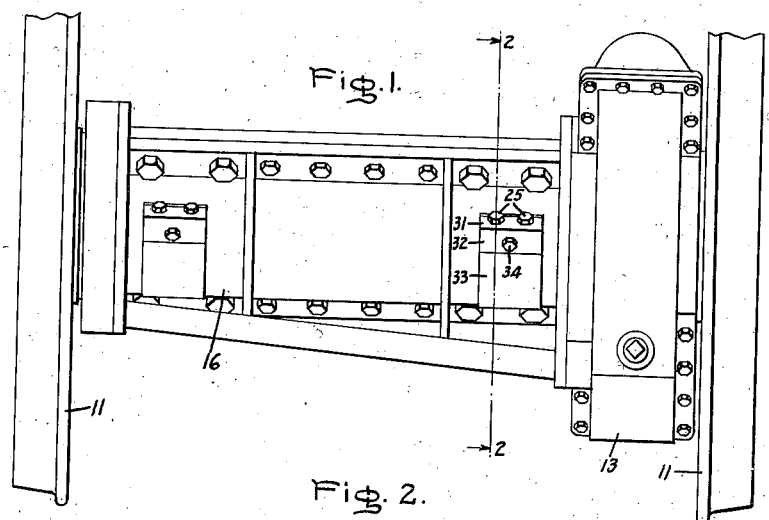
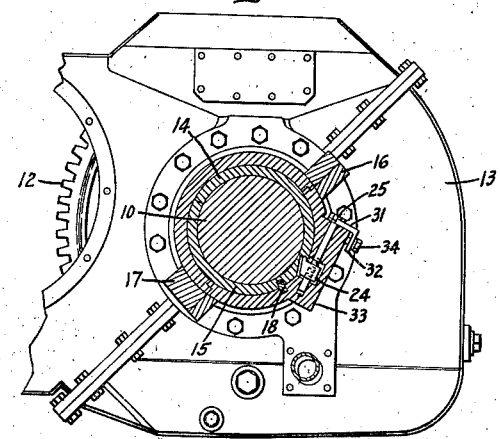
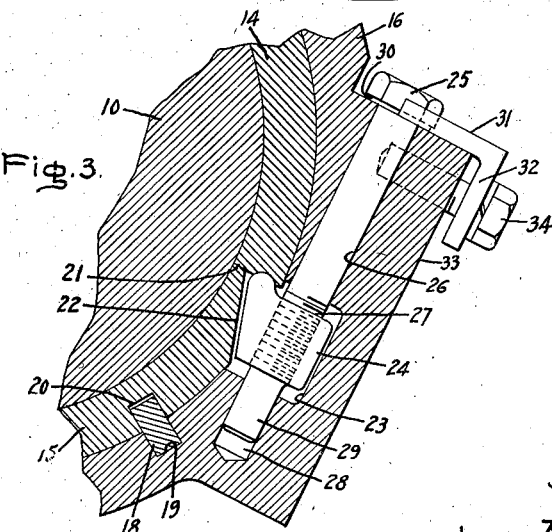
Inventor:
John W. Teker,
by Harry E. Dunham
His Attorney.

Patented Aug. 12, 1941

2,252,446

UNITED STATES PATENT OFFICE 2,252,446

BEARING CONSTRUCTION

John W. Teker, Wesleyville, Pa., assignor to General Electric Company, a corporation of New York Application March 18, 1941, Serial No. 383,952

6 Claims. (Cl. 308—237)

My invention relates to bearing constructions and particularly to an improved construction for expanding and securing a split bearing sleeve in its bearing housing or axle supported by the sleeve.

An object of my invention is to provide an improved bearing construction provided with a device for expanding and securing the bearing lining in its bearing housing.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a side elevational view of a railway axle assembly provided with my improved bearing construction; Fig. 2 is a sectional view taken along line 2—2 of Fig. 1; and Fig. 3 is an enlarged sectional view of my improved clamping device and bearing construction illustrated in Fig. 2.

Referring to the drawing, I have shown a railway vehicle axle 10 on which driving wheels 11 are mounted and which is adapted to be driven by an axle gear 12 arranged in a gear casing 13. The gear casing and lubricating arrangement for this geared axle drive is the subject of copending patent application Serial No. 355,004, filed August 31, 1940, J. W. Teker and J. C. Rhoads, and assigned to the assignee of this application. A split bearing is provided for supporting the axle 10 and includes a pair of complementary semi-cylindrical bearing lining sections 14 and 15 forming a split bearing lining arranged within a split axle cap or bearing housing formed of complementary semi-cylindrical sections 16 and 17. It is desirable with such a construction to provide a device for expanding and securing the bearing linings 14 and 15 within the bearing housing formed by the axle cap sections 16 and 17 without requiring the opening of the oil-tight joints of the axle cap or bearing housing. In order to provide this adjustment, the split axle lining 15 is secured against rotation relative to the axle cap 16 by a key 18 which is fitted into a keyway 19 formed in the axle cap 16 and a complementary keyway 20 formed in the bearing lining 15 adjacent an edge of the split 21 between the bearing linings 14 and 15. The end of the bearing lining 15 adjacent the keyway 20 is chamfered at 22 to provide an inwardly tapered surface and to provide an exposed portion of the adjacent edge of the split bearing lining 14. A clamping block housing 23 is formed in the axle cap 16 to accommodate a clamping block 24 arranged in engagement with the edge of the split bearing lining 14 which is exposed by the chamfer 22 of the bearing lining 15. Adjustment of the fit of the split bearing linings 14 and 15 in the axle cap can be obtained by varying the clamping pressure on the bearing linings 14 and 15 between the clamping block 24 and the key 18. This adjustment is obtained by adjusting the position of a pair of clamping bolts 25 which extend through clamping bolt openings 26 in the axle cap and have a threaded engagement 27 with the bearing block 24. In order to maintain alignment of the clamping block and the clamping bolts and to prevent bending of the clamping bolts 25, a supplementary clamping bolt socket 28 is formed in the clamping block housing portion of the axle cap and extends from the clamping block housing 23 in alignment with the clamping bolt opening 26 on the side of the housing opposite the clamping bolt opening 26. The end 29 of the clamping bolt 25 is adapted to fit into the socket 28, and this end of the bolt is formed of a diameter smaller than the remainder of the bolt, so that it may readily pass through the threaded portion of the clamping block 24. An oil-tight joint between this adjusting device and the axle cap is insured by providing a gasket 30, such as a copper washer, under the head of the bolt 25 in engagement with the under side of the head and the outer side of the clamping block housing adjacent the clamping bolt opening. Adjustment of the clearance between the bearing linings and the axle is readily provided by turning the clamping bolts 25 by any suitable means from the exterior of the axle cap without removal of any of the essential axle cap elements, and thereby insuring an oil-tight seal at all times. In order to lock the clamping bolts 25 in the desired adjusted positions, a locking plate 31 is provided with a pair of apertures adapted to fit about the heads of the bolts 25 and is provided with a side 32 which extends over the outer side 33 of the clamping block housing 23. This locking plate is adapted to be secured to the housing by a locking bolt 34 which extends through an opening in the side 32 and threadedly engages an opening formed in the clamping block housing. With such a construction, the bearing lining may be expanded within the bearing housing from the exterior of the axle cap, and the adjustment of the clamping device will be maintained even if it is subjected to considerable vibration.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A bearing construction for an axle including an axle cap, a split bearing lining in said axle cap, means adjacent an edge of said split in said bearing lining for securing said bearing lining against rotation relative to said axle cap, a clamping block housing formed in said axle cap, a clamping block arranged in said housing and adapted to bias said split bearing lining toward said bearing lining securing means, and means including a clamping bolt extending through said axle cap and having a threaded engagement with said clamping block for expanding said bearing lining in said axle cap.

2. A bearing construction for a shaft including a bearing housing, a split bearing lining in said housing, a keyway in said bearing lining, a key extending into said keyway arranged to secure said bearing lining against rotation relative to said bearing housing, an adjustable clamping block arranged in said housing and adapted to bias said split bearing lining towards said key, and means including a clamping bolt extending through said bearing housing and having threaded engagement with said clamping block for expanding said bearing lining in said bearing housing.

3. A bearing construction for an axle including an axle cap, a split bearing lining in said axle cap, means adjacent an edge of said split in said bearing lining for securing said bearing lining against rotation relative to said axle cap, a clamping block housing formed in said axle cap, a clamping block arranged in said housing in engagement with an edge of said split bearing lining, means including a clamping bolt extending through said clamping block housing having a threaded engagement with said clamping block for adjusting the clamping of said clamping block on said bearing lining to vary the fit of said bearing lining in said axle cap, and a removable locking plate arranged in engagement with said clamping bolt for locking said clamping bolt in position.

4. A bearing construction for an axle including an axle cap, a split bearing lining in said axle cap, means adjacent an edge of said split in said bearing lining for securing said bearing lining against rotation relative to said axle cap, a clamping block housing formed in said axle cap, a clamping block arranged in said housing in engagement with an edge of said split bearing lining on the side of the split in said bearing lining opposite said bearing lining securing means, a clamping bolt opening extending from said clamping block housing to the exterior of said axle cap, a supplementary clamping bolt socket extending from said clamping block housing formed in said axle cap and in alignment with said clamping bolt openings, and means including a clamping bolt extending through said clamping bolt opening into said clamping bolt socket and having a threaded engagement with said clamping block for adjusting the clamping of said clamping block on said bearing lining to vary the fit of said bearing lining in said axle cap.

5. A bearing construction for an axle including an axle cap, a split bearing lining in said axle cap, means adjacent an edge of said split in said bearing lining for securing said bearing lining against rotation relative to said axle cap, a clamping block housing formed in said axle cap, a clamping block arranged in said housing in engagement with an edge of said split bearing lining, a clamping bolt opening extending from said clamping block housing to the exterior of said axle cap, a supplementary clamping bolt socket extending from said clamping block housing formed in said axle cap and in alignment with said clamping bolt opening, and means including a clamping bolt extending through said clamping bolt opening into said clamping bolt socket and having a threaded engagement with said clamping block for adjusting the clamping of said clamping block on said bearing lining to vary the fit of said bearing lining in said axle cap, and means for sealing the outer end of said clamping bolt opening.

6. A bearing construction for an axle including an axle cap, a split bearing lining in said axle cap, means adjacent an edge of said split in said bearing lining for securing said bearing lining against rotation relative to said axle cap, a clamping block housing formed in said axle cap, a clamping block arranged in said housing in engagement with an edge of said split bearing lining on the side of the split in said bearing lining opposite said bearing lining securing means, a clamping bolt opening extending from said clamping block housing to the exterior of said axle cap, a supplementary clamping bolt socket extending from said clamping block housing formed in said axle cap and in alignment with said clamping bolt opening, means including a clamping bolt extending through said clamping bolt opening into said clamping bolt socket and having a threaded engagement with said clamping block for adjusting the clamping of said clamping block on said bearing lining to vary the fit of said bearing lining in said axle cap, means for sealing the outer end of said clamping bolt opening, and a removable locking plate arranged in engagement with said clamping bolt for locking said clamping bolt in position.

JOHN W. TEKER.